(12) United States Patent
Vaarala et al.

(10) Patent No.: US 7,937,581 B2
(45) Date of Patent: *May 3, 2011

(54) METHOD AND NETWORK FOR ENSURING SECURE FORWARDING OF MESSAGES

(75) Inventors: Sami Vaarala, Helsinki (FI); Antti Nuopponen, Espoo (FI)

(73) Assignee: MPH Technologies OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/560,481

(22) Filed: Sep. 16, 2009

(65) Prior Publication Data

US 2010/0049967 A1    Feb. 25, 2010

Related U.S. Application Data

(63) Continuation of application No. 10/490,932, filed as application No. PCT/FI02/00770 on Sep. 27, 2002, now Pat. No. 7,620,810.

(30) Foreign Application Priority Data

Sep. 28, 2001  (FI) ...................................... 20011910

(51) Int. Cl.
 *H04L 9/00* (2006.01)

(52) U.S. Cl. ........ 713/153; 713/151; 713/161; 380/247; 709/228; 370/401; 370/338; 455/436

(58) Field of Classification Search .................... 713/161
 See application file for complete search history.

(56) References Cited

U.S. PATENT DOCUMENTS 6,170,057 B1 *  1/2001  Inoue et al. .................... 713/153
6,976,177 B2 * 12/2005  Ahonen ............................ 726/3

* cited by examiner

*Primary Examiner* — Nasser Moazzami
*Assistant Examiner* — Fikremariam Yalew
(74) *Attorney, Agent, or Firm* — Fasth Law Offices; Rolf Fasth

(57) ABSTRACT

The method and network ensure secure forwarding of a message in a telecommunication network that has at least one first terminal and another terminal. The first terminal moves from a first address to a second address. A secure connection between the first address of the first terminal and the other terminal defining at least the addresses of the two terminals is established. When the first terminal moves from the first address to a second address, the connection is changed to be between the second address and to the other terminal by means of a request from the first terminal and preferably a reply back to the first terminal.

9 Claims, 5 Drawing Sheets

METHOD AND NETWORK FOR ENSURING SECURE FORWARDING OF MESSAGES

PRIOR APPLICATIONS

This is a continuation patent application that claims priority from U.S. patent application Ser. No. 10/490,932, filed 22 Nov. 2004, now U.S. Pat. No. 7,620,810 that claims priority from PCT/FI02/00770, filed 27 Sep. 2002, that claims priority from Finnish Patent Application No. 20011910, filed 28 Sep. 2001.

TECHNICAL FIELD

The method and network of the invention is intended to secure mobile connections in telecommunication networks. Especially, it is meant for IPSec connections.

The invention provides a method for ensuring secure forwarding of a message in a telecommunication network comprising at least one mobile terminal and another terminal, when the mobile terminal moves from a first address to a second address and there is a secure connection established between the first address of the mobile terminal and the other terminal, which secure connection defines at least the addresses of the two terminals. The invention also provides a network for performing such a method.

TECHNICAL BACKGROUND

An internetwork is a collection of individual networks connected with intermediate networking devices and functions as a single large network. Different networks can be interconnected by routers and other networking devices to create an internetwork.

A local area network (LAN) is a data network that covers a relatively small geographic area. It typically connects workstations, personal computers, printers and other devices. A wide area network (WAN) is a data communication network that covers a relatively broad geographic area. Wide area networks (WANs) interconnect LANs across normal telephone lines and, for instance, optical networks; thereby interconnecting geographically disposed users.

There is a need to protect data and resources from disclosure, to guarantee the authenticity of data, and to protect systems from network based attacks. More in detail, there is a need for confidentiality (protecting the contents of data from being read), integrity (protecting the data from being modified, which is a property that is independent of confidentiality), authentication (obtaining assurance about the actual sender of data), replay protection (guaranteeing that data is fresh, and not a copy of previously sent data), identity protection (keeping the identities of parties exchanging data secret from outsiders), high availability, i.e. denial-of-service protection (ensuring that the system functions even when under attack) and access control. IPSec is a technology providing most of these, but not all of them. (In particular, identity protection is not completely handled by IPSec, and neither is denial-of-service protection.)

The IP security protocols (IPSec) provides the capability to secure communications between arbitrary hosts, e.g. across a LAN, across private and public wide area networks (WANs) and across the internet. IPSec can be used in different ways, such as for building secure virtual private networks, to gain a secure access to a company network, or to secure communication with other organisations, ensuring authentication and confidentiality and providing a key exchange mechanism. IPSec ensures confidentiality integrity, authentication, replay protection, limited traffic flow confidentiality, limited identity protection, and access control based on authenticated identities. Even if some applications already have built in security protocols, the use of IPSec further enhances the security.

IPSec can encrypt and/or authenticate traffic at IP level. Traffic going in to a WAN is typically compressed and encrypted and traffic coming from a WAN is decrypted and decompressed. IPSec is defined by certain documents, which contain rules for the IPSec architecture. The documents that define IPSec, are, for the time being, the Request For Comments (RFC) series of the Internet Engineering Task Force (IETF), in particular, RFCs 2401-2412.

Two protocols are used to provide security at the IP layer; an authentication protocol designated by the header of the protocol, Authentication Header (AH), and a combined encryption/authentication protocol designated by the format of the packet for that protocol, Encapsulating Security Payload (ESP). AH and ESP are however similar protocols, both operating by adding a protocol header. Both AH and ESP are vehicles for access control based on the distribution of cryptographic keys and the management of traffic flows related to these security protocols.

Security association (SA) is a key concept in the authentication and the confidentiality mechanisms for IP. A security association is a one-way relationship between a sender and a receiver that offers security services to the traffic carried on it. If a secure two-way relationship is needed, then two security associations are required. If ESP and AH are combined, or if ESP and/or AH are applied more than once, the term SA bundle is used, meaning that two or more SAs are used. Thus, SA bundle refers to one or more SAs applied in sequence, e.g. by first performing an ESP protection, and then an AH protection. The SA bundle is the combination of all SAs used to secure a packet.

The term IPsec connection is used in what follows in place of an IPSec bundle of one or more security associations, or a pair of IPSec bundles—one bundle for each direction—of one or more security associations. This term thus covers both unidirectional and bi-directional traffic protection. There is no implication of symmetry of the directions, i.e., the algorithms and IPSec transforms used for each direction may be different.

A security association is uniquely identified by three parameters. The first one, the Security Parameters Index (SPI), is a bit string assigned to this SA. The SPI is carried in AH and ESP headers to enable the receiving system to select the SA under which a received packet will be processed. IP destination address is the second parameter, which is the address of the destination end point of the SA, which may be an end user system or a network system such as a firewall or a router. The third parameter, the security protocol identifier indicates whether the association is an AH or ESP security association.

In each IPSec implementation, there is a nominal security association data base (SADB) that defines the parameters associated with each SA. A security association is normally defined by the following parameters. The Sequence Number Counter is a 32-bit value used to generate the sequence number field in AH or ESP headers. The Sequence Counter Overflow is a flag indicating whether overflow of the sequence number counter should generate an auditable event and prevent further transmission of packets on this SA. An Anti-Replay Window is used to determine whether an inbound AH or ESP packet is a replay. AH information involves information about the authentication algorithm, keys and related parameters being used with AH. ESP information involves information of encryption and authentication algorithms, keys, initialisation vectors, and related parameters being used with IPSec. The sixth parameter, Lifetime of this Security Association, is a time-interval and/or byte-count after which a SA must be replaced with a new SA (and new SPI) or terminated plus an indication of which of these actions should occur. IPSec Protocol Mode is either tunnel or transport mode. Path MTU, which is an optional feature, defines the maximum size of a packet that can be transmitted without fragmentation.

Both AH and ESP support two modes used, transport and tunnel mode.

Transport mode provides protection primarily for upper layer protocols and extends to the payload of an IP packet. Typically, transport mode is used for end-to-end communication between two hosts. Transport mode may be used in conjunction with a tunnelling protocol (other that IPSec tunnelling).

Tunnel mode provides protection to the entire IP packet and is generally used for sending messages through more than two components, although tunnel mode may also be used for end-to-end communication between two hosts. Tunnel mode is often used when one or both ends of a SA is a security gateway, such as a firewall or a router that implements IPSec. With tunnel mode, a number of hosts on networks behind firewalls may engage in secure communications without implementing IPSec. The unprotected packets generated by such hosts are tunnelled through external networks by tunnel mode SAs set up by the IPSec software in the firewall or secure router at boundary of the local network.

To achieve this, after the AH or ESP fields are added to the IP packet, the entire packet plus security fields are treated as the payload of a new outer IP packet with a new outer IP header. The entire original, or inner, packet travels through a tunnel from one point of an IP network to another: no routers along the way are able to examine the inner IP packet. Because the original packet is encapsulated, the new larger packet may have totally different source and destination addresses, adding to the security. In other words, the first step in protecting the packet using tunnel mode is to add a new IP header to the packet; thus the "IP|payload" packet becomes "IP|IP|payload". The next step is to secure the packet using ESP and/or AH. In case of ESP, the resulting packet is "IP|ESP|IP|payload". The whole inner packet is covered by the ESP and/or AH protection. AH also protects parts of the outer header, in addition to the whole inner packet.

The IPSec tunnel mode operates e.g. in such a way that if a host on a network generates an IP packet with a destination address of another host on another network, the packet is routed from the originating host to a security gateway (SGW), firewall or other secure router at the boundary of the first network. The SGW or the like filters all outgoing packets to determine the need for IPSec processing. If this packet from the first host to another host requires IPSec, the firewall performs IPSec processing and encapsulates the packet in an outer IP header. The source IP address of this outer IP header is this firewall and the destination address may be a firewall that forms the boundary to the other local network. This packet is now routed to the other host's firewall with intermediate routers examining only the outer IP header. At the other host firewall, the outer IP header is stripped off and the inner packet is delivered to the other host.

ESP in tunnel mode encrypts and optionally authenticates the entire inner IP packet, including the inner IP header. AH in tunnel mode authenticates the entire inner IP packet, including the inner IP header, and selected portions of the outer IP header.

The key management portion of IPSec involves the determination and distribution of secret keys. The default automated key management protocol for IPSec is referred to as ISAKMP/Oakley and consists of the Oakley key determination protocol and Internet Security Association and Key Management Protocol (ISAKMP). Internet key exchange (IKE) is a newer name for the ISAKMP/Oakley protocol. IKE is based on the Diffie-Hellman algorithm and supports RSA signature authentication among other modes. IKE is an extensible protocol, and allows future and vendor-specific features to be added without compromising functionality.

IPSec has been designed to provide confidentiality, integrity, and replay protection for IP packets. However, IPSec is intended to work with static network topology, where hosts are fixed to certain subnetworks. For instance, when an IPSec tunnel has been formed by using Internet Key Exchange (IKE) protocol, the tunnel endpoints are fixed and remain constant. If IPSec is used with a mobile host, the IKE key exchange will have to be redone from every new visited network. This is problematic, because IKE key exchanges involve computationally expensive Diffie-Hellman key exchange algorithm calculations and possibly RSA calculations. Furthermore, the key exchange requires at least three round trips (six messages) if using the IKE aggressive mode followed by IKE quick mode, and nine messages if using IKE main mode followed by IKE quick mode. This may be a big problem in high latency networks, such as General Packet Radio Service (GPRS) regardless of the computational expenses.

In this text, the term mobility and mobile terminal does not only mean physical mobility, instead the term mobility is in the first hand meant moving from one network to another, which can be performed by a physically fixed terminal as well.

The problem with standard IPSec tunnel end points are that they are fixed. A SA is bound to a certain IP address, and if it is changed, the existing IPSec SA becomes useless because it has been established by using different endpoint addresses. The problem has been discussed in the IETF standardisation forum, www.IETF.org, wherein an idea to support mobility for IPSec ESP tunnels by means of signalling to update the address of one end after a movement was mentioned by Francis Dupont. No solutions have however been presented until this date.

The standard Mobile IP protocol provides a mobile terminal with a mobile connection, and defines mechanisms for performing efficient handovers from one network to another. However, Mobile IP has several disadvantages. The security of Mobile IP is very limited. The mobility signalling messages are authenticated, but not encrypted, and user data traffic is completely unprotected. Also, there is no key exchange mechanism for establishing the cryptographic keys required for authenticating the mobility signalling. Such keys need to be typically distributed manually. Finally, the current Mobile IP protocol does not define a method for working through Network Address Translation (NAT) devices.

A way to solve this problem is to use e.g. Mobile IP to handle the mobility of the host, and use IPSec on top of the static IP address provided by the Mobile IP. Thus, the IPSec SAs are bound to static addresses, and the IPSec SAs can survive mobility of the host. However, this approach suffers from packet size overhead of both Mobile IP and IPSec tunnels, which can affect performance considerably when using links with small throughput.

The documents that define IP in general are the RFC standards RFC 768, RFC 791, RFC 793, RFC 826 and RFC 2460.

RFC 2002, RFC 2003, RFC 2131, RFC 3115, MOBILE Ipv4 and IPv6, and DHCPV6 define Mobile IP, IP-IP and DHCP.

REFERENCES

The following is a list of useful references of standards mentioned.
IP in General, TCP and UDP:
[RFC768]
J. Postel, User Datagram Protocol, RFC 768, August 1980.
ftp://ftp.isi.edu/in-notes/rfc768.txt
[RFC791]
J. Postel, Internet Protocol, RFC 791, September 1981.
ftp://ftp.isi.edu/in-notes/rfc791.txt
[RFC792]
J. Postel, Internet Control Message Protocol, RFC 792, September 1981.
ftp://ftp.isi.edu/in-notes/rfc792.txt
[RFC793]
J. Postel, Transmission Control Protocol, RFC 793, September 1981.
ftp://ftp.isi.edu/in-notes/rfc793.txt
[RFC826]
D. C. Plummer, An Ethernet Address Resolution Protocol, RFC 826, November 1982.
ftp://ftp.isi.edu/in-notes/rfc826.txt
[RFC2460]
S. Deering, R. Hinden, Internet Protocol, Version 6 (IPv6) Specification, RFC 2460, December 1998.
Mobile IP; IP-IP; DHCP:
[RFC2002]
C. Perkins, IP Mobility Support, RFC 2002, October 1996.
ftp://ftp.isi.edu/in-notes/rfc2002.txt
[RFC2003]
C. Perkins, IP Encapsulation Within IP, RFC 2003, October 1996.
ftp://ftp.isi.edu/in-notes/rfc2003.txt
[RFC2131]
R. Droms, Dynamic Host Configuration Protocol, RFC 2131, March 1997.
ftp://ftp.isi.edu/in-notes/rfc2131.txt
[RFC3115]
G. Dommety, and K. Leung, Mobile IP Vendor/Organization-specific Extensions, RFC 3115, April 2001.
ftp://ftp.isi.edu/in-notes/rfc3115.txt
[MOBILEIPv6]
D. B. Johnson, C. Perkins, Mobility Support in IPv6, Work in progress (Internet-Draft is available), July 2000.
[DHCPV6]
J. Bound, M. Carney, C. Perking, R. Droms, Dynamic Host Configuration Protocol for IPv6 (DHCPv6), Work in progress (Internet-Draft is available), June 2001.
IPsec Standards:
[RFC2401]
S. Kent, and R. Atkinson, Security Architecture for the Internet Protocol, RFC 2401, November 1998.
ftp://ftp.isi.edu/in-notes/rfc2401.txt
[RFC2402]
S. Kent, and R. Atkinson, IP Authentication Header, RFC 2402, November 1998.
ftp://ftp.isi.edu/in-notes/rfc2402.txt
[RFC2403]
C. Madson, R. Glenn, The Use of HMAC-MD5-96 within ESP and AH, RFC 2403, November 1998.
[RFC2404]
C. Madson, R. Glenn, The Use of HMAC-SHA-1-96 within ESP and AH, RFC 2404, November 1998.
[RFC2405]
C. Madson, N. Doraswamy, The ESP DES-CBC Cipher Algorithm With Explicit IV, RFC 2405, November 1998.
[RFC2406]
S. Kent, and R. Atkinson, IP Encapsulating Security Payload (ESP), RFC 2406, November 1998.
ftp://ftp.isi.edu/in-notes/rfc2406.txt
[RFC2407]
D. Piper, The internet IP Security Domain of Interpretation for ISAKMP, RFC 2407, November 1998.
ftp://ftp.isi.edu/in-notes/rfc2407.txt
[RFC2408]
D. Maughan, M. Schneider, M. Schertler, and J. Turner, Internet Security Association and Key Management Protocol (ISAKMP), RFC 2408, November 1998.
ftp://ftp.isi.edu/in-notes/rfc2408.txt
[RFC2409]
D. Harkins, and D. Carrel, The Internet Key Exchange (IKE), RFC 2409, November 1998.
ftp://ftp.isi.edu/in-notes/rfc2409.txt
[RFC2410]
R. Glenn, S. Kent, The NULL Encryption Algorithm and Its Use With IPsec, RFC 2410, November 1998.
[RFC2411]
R. Thayer, N. Doraswamy, R. Glenn, IP Security Document Roadmap, RFC 2411, November 1998.
[RFC2412]
H. Orman, The OAKLEY Key Determination Protocol, RFC 2412, November 1998.
NAT:
[RFC2694]
P. Srisuresh, G. Tsirtsis, P. Akkiraju, and A. Heffernan, DNS extensions to Network Address Translators (DNS_ALG), RFC 2694, September 1999.
[RFC3022]
P. Shisuresh, K. Egevang, Traditional IP Network Address Translator (Traditional NAT), RFC 3022, January 2001.
ftp://ftp.isi.edu/in-notes/rfc3022.txt

THE OBJECT OF THE INVENTION

The object of the invention is to ensure secure forwarding of messages from and to mobile terminals by avoiding the problems of prior art.

SUMMARY OF THE INVENTION

The method and network of the invention is to ensure secure forwarding of a message in a telecommunication network, comprising at least one first terminal and another terminal. In the method, the first terminal moves from a first address to a second address. A secure connection between the first address of the first terminal and the other terminal defining at least the addresses of the two terminals is established. The first terminal moves from the first address to a second address. The connection is changed to be between the second address and the other terminal by means of a request from the first terminal and preferably, a reply back to the first terminal.

In the invention, the first terminal is movable from one network to another. Such a terminal can physically be a mobile terminal or a fixed terminal.

The secure connection is an IPSec connection established by forming one or more Security Associations (SAs) using the IPSec protocols. The request and/or the reply message can be protected e.g. by IPSec encryption and/or authentication, possibly using the same IPSec SA that is used for traffic protection purposes.

In general, registration request and registration reply are Mobile IP terms while the invention is not bound to Mobile IP. In the invention, the terms request and reply are used in the generic sense, and may or may not be related to Mobile IP.

The method of the invention can be used in different kinds of networks. If the first terminal and the other terminal form an end-to-end connection, the secure connection may be an IPSec tunnel mode or transport mode connection. Furthermore, one of or both of the first terminal and the other terminal can be a security gateway protecting one or more computers, whereby IPSec tunnel mode, or IPSec transport mode together with a tunnelling protocol (such as Layer 2 Tunnelling Protocol, L2TP), is used for the secure connection between the first terminal and the other terminal.

If both terminals are mobile, a special solution is required for the situation when both terminals move simultaneously in case of a so called "double jump" situation. This solution can be implemented e.g. by using a centralised registry of current locations of hosts, although other solutions exist for the problem. However, the "changeable" IPSec tunnel or transport mode SAs of the invention could be used in that case, too.

The applicant has solved the above problems of prior art by defining a signalling mechanism that allows an existing IPSec security association, that is, the symmetric encryption and authentication algorithms used for packet processing, along with their keys and other parameters, to be moved from one network to another. To be more precise, an existing IPSec tunnel endpoint can be moved in the invention from one point of attachment to another. For instance, an IPSec tunnel established between addresses A and X tunnel can be changed by using the defined signalling to be between addresses B and X, using only a single round trip for signalling (2 messages), or half a round trip (1 message, if a reply message is not used) for signalling. The solution requires minimal computational overhead compared to Diffie-Hellman or strong authentication calculations.

The signalling mechanism is preferably similar to the one in Mobile IP, i.e. a registration request (RREQ) is sent to the other end of the SA followed by a registration reply (RREP) back to the sender of the RREQ message, both of which are extensible for future features and optional attributes. The RREQ/RREP message pair is sent from the new network, and once properly authenticated, the sender IPSec tunnel endpoint is updated from the old network to the new network.

In case the security association used for protecting user traffic is also used for signalling purposes, the reception of the RREQ message by the other end of the SA requires a change in a normal IPSec implementation to accept a packet that appears to belong to a certain IPSec tunnel, but comes from a wrong address (i.e. the tunnel is currently between A and X, and the RREQ comes from address B). This is only necessary for the RREQ message. Such an implementation is provided by the invention; it is necessary to modify IPSec if IPSec is used for the RREQ/RREP signalling. In that case, it is required specifically for processing of the RREQ and RREP messages, if the reply message is to be used.

The request message may update a set of security associations, for instance, a single security association, a security association bundle, an IPSec connection, a group of IPSec connections, or any combinations of these. In practice, it is useful to update either a single IPSec connection or a group of IPSec connections. The latter may be important if separate IPSec connections are used for different kinds of traffic. A single request message can then update all (or a certain set) of such connections to a new address, instead of requiring separate requests for each IPSec connection. In the following, the case of updating a single IPSec connection is discussed, without limiting the invention to this behaviour.

Another method of performing the signalling is to use a separate protocol. The protocol should preferably provide encryption and/or authentication of the signalling messages. The IKE protocol already has messages defined for e.g. deleting IPSec SAs. One method of providing the necessary signalling would be by adding a new IKE notification message type that requests a change in an existing IPSec SA. Such a message should provide its own encryption and/or authentication to avoid requiring an IKE connection set up from the new address, which would require extra messaging.

IP version 4 (IPv4) is the currently widely deployed Internet Protocol version. Its major disadvantage is the small number of unique, public IP addresses. IP version 6 (IPv6) has a much larger address space, which fixes the most important IPv4 problem known today. IPv6 also changes some other things in the Internet Protocol, for example, how fragmentation of packets is done, but these changes are quite small. Most protocols have separate definitions on how they are used within the IPv4 and the IPv6 context. For instance, there are separate versions of IPSec and Mobile IP for use with IPv4 and IPv6. However, such modifications to protocols are quite small, and do not usually change the essentials of the protocols significantly. The invention can be applied to both IPv4 and IPv6.

In the following, the invention is further described by means of figures and some examples. The intention is not to restrict the invention to the details of the following description or to the details of protocols such as the IPSec and IKE protocols which might be changed in the future.

FIGURES

Figure 4:
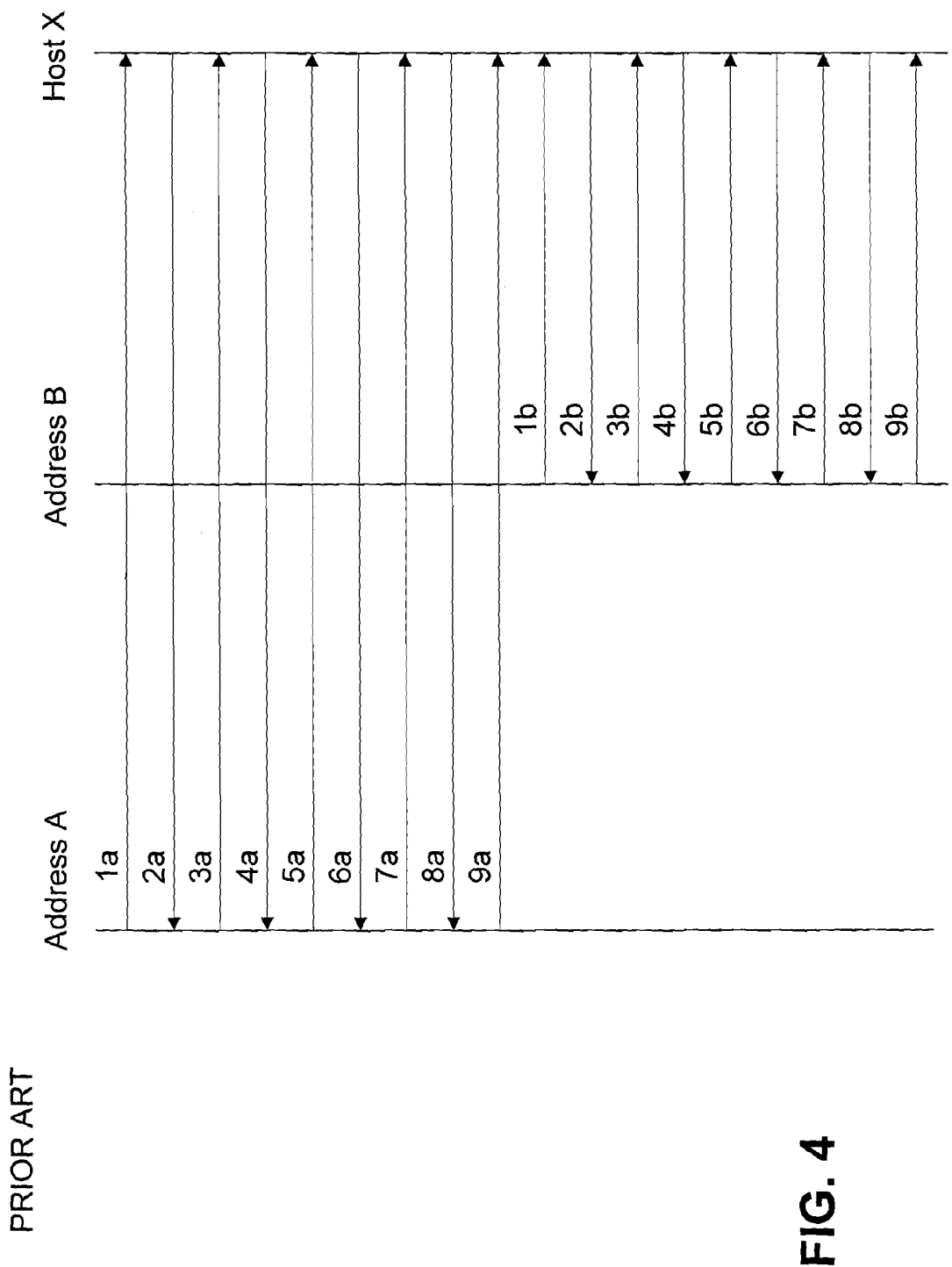

FIG. 4 describes the prior art solution to enable mobility for IPSec connections.

Figure 5:
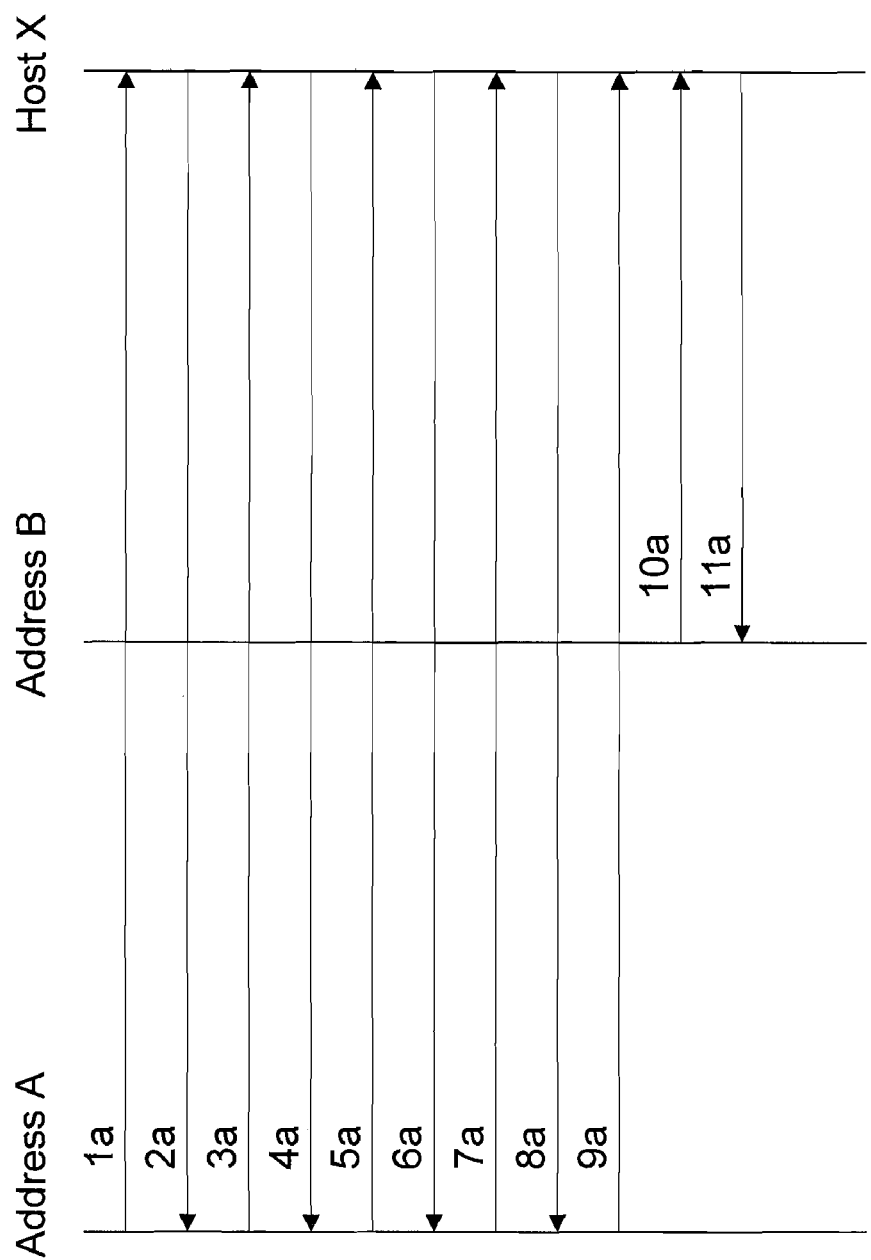

FIG. 5 describes the method of the invention to enable mobility for IPSec connections.

DETAILED DESCRIPTION

Figure 1:
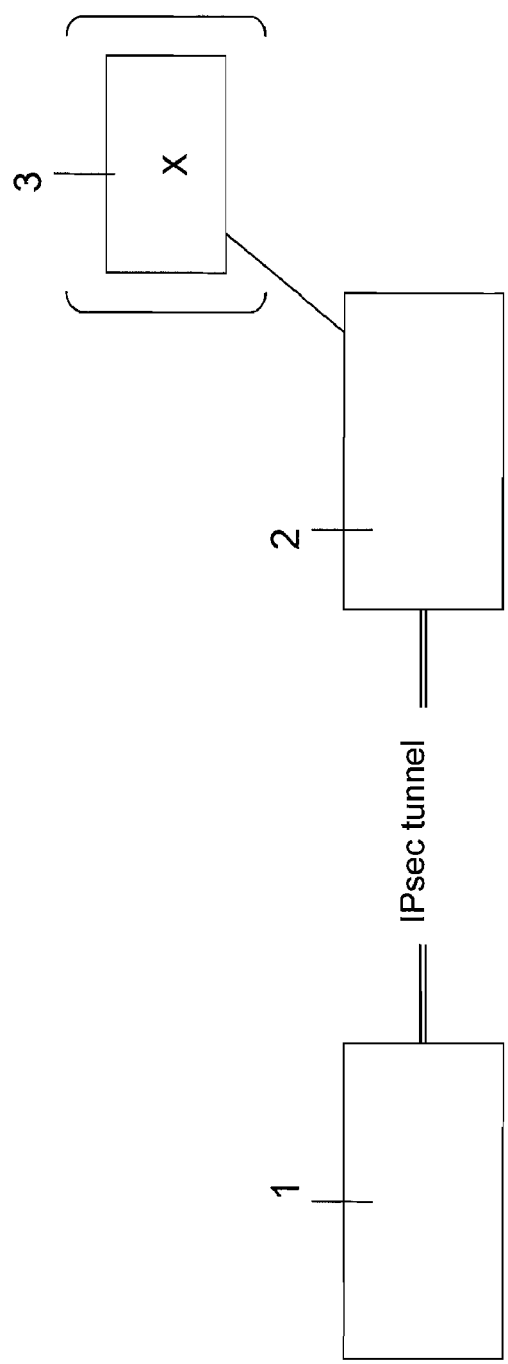
FIG. 1 illustrates an example of a telecommunication network to be used in the invention.

FIG. 1 illustrates an example of a telecommunication network to be used in the invention. Thus, in FIG. 1, computer 1 may be a client computer and computer 2 a destination computer, to which the secure messages are sent in the invention by means of an IPSec tunnel established between computer 1 and computer 2. Computer 2 might be a security gateway for a third computer 3. Then, the messages sent from computer 2 to computer 3 are sent in plaintext. The security gateway can be a common security gateway for e.g. a company LAN, whereby there are several computers in the LAN protected by computer 2. The other protected computers are not shown in FIG. 1, but naturally, the invention covers also such networks.

sent in plaintext as the IPSec tunnel only exist between computers 1 and 2.

Figure 3:
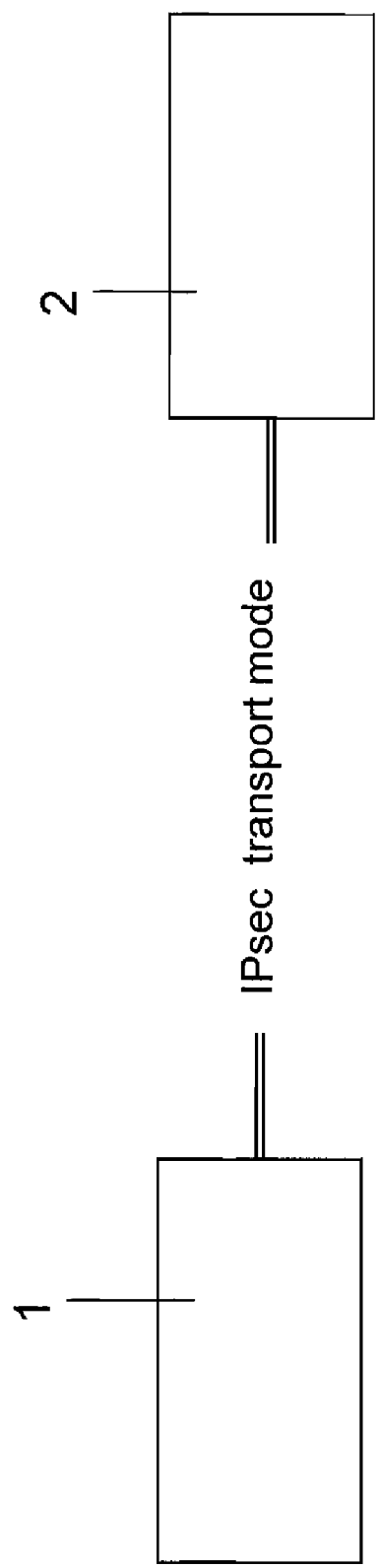
FIG. 3 illustrates a third example of a telecommunication network to be used in the invention.

The network of FIG. 3 is a network, wherein the IPSec messages are sent between an end-to-end connection between two computers 1, 2 only whereby IPSec transport mode can be used instead of tunnel mode.

FIG. 4 describes the prior art solution to enable mobility for IPSec connections. As a diagram, this is the standard IPSec procedure when establishing a tunnel between addresses A and X, and then B and X.

The protocol begins with the IKE main mode requiring 6 messages in total, see steps 1a-6a in FIG. 4. The protocol involves strong user authentication, policy negotiation and the use of the Diffie-Hellman algorithm. Any other IKE phase 1 mode might of course be used as an alternative. Another approach to minimise the number of message exchanges would be to avoid IKE phase 1 and perform only the IKE quick mode (3 messages). However, IKE phase 1 is associated with IP addresses (along with other identifying information). A modified implementation might ignore IP addresses when processing IKE messages, and thus be able to maintain IKE phase 1 state between connection points.

The protocol then continues with IKE quick mode requiring 3 messages in total (steps 7a-9a in FIG. 4). Quick mode includes IPSec policy negotiation and optionally the use of the Diffie-Hellman algorithm. An alternative IKE phase 2 exchange could of course be used instead of quick mode.

At this point the tunnel has been established between addresses A and X. 9 messages have been used along with the computational expense (each Diffie-Hellman computation may take hundreds of milliseconds, for instance, depending on the host), also the roundtrip times being considerable (9/2=4.5 roundtrips, with a roundtrip time of 500 ms this is 2.25 seconds for latency alone).

The movement of the mobile terminal to address B causes full re-negotiation and again IKE main mode requires 6 messages in total (steps 1b-6b in FIG. 4), strong user authentication, policy negotiation, and optionally the use of the Diffie-Hellman algorithm.

The use of the protocol continues with IKE quick mode requiring 3 messages total (steps 7b-9b). The network of FIG. 2 otherwise corresponds to that of FIG. 1, but in FIG. 2 also computer 1 is a security gateway, e.g. for computer 4. Also here, the security gateway 1 can be a common security gateway for e.g. a company LAN, whereby there are several computers in the LAN protected by computer 1. The other protected computers are not shown in FIG. 2. But naturally, the invention covers also such networks. The messages between security gateway 1 and the computers it protects are The tunnel between addresses B and X is now complete.

FIG. 5 describes the method of the invention. To establish the tunnel between address A and host X, IKE main mode is again used requiring 6 messages in total (steps 1a-6a in FIG. 5) as in FIG. 4 including strong user authentication, policy negotiation and the use of the Diffie-Hellman algorithm.

Then IKE quick mode is again used requiring 3 messages in total (steps 7a-9a in FIG. 5). The quick mode includes IPSec policy negotiation, and optionally the use of the Diffie-Hellman algorithm.

Again, IKE main mode may be replaced by any other IKE phase 1 mode, and IKE quick mode by any other IKE phase 2 mode.

At this point the tunnel has been established between addresses A and X. 9 messages have been used along with the computational expense.

In the invention, movement to address B requires only a single round trip, when using registration request messages to be sent from the mobile terminal, when it moves from address A to address B. In signal 10a of FIG. 5, which is sent from the mobile terminal to the other end of the established IPSec tunnel when it has moved to address B, a request for registration (RREQ) of the new address is sent. Preferably, a reply message (RREP) is sent (step 11a) from the host to confirm the address change. Both signals 10a and 11a can be encrypted and/or authenticated. The encryption and/or authentication is preferably performed by using IPSec, in which case it is preferable to use the same IPSec SA for protecting both data and registration traffic.

11a is optional in the invention. The preferable encryption method is IPSec, preferably with the modified reception processing described previously. However, the exact method of signalling is not important, the essence is to carry over the IPSec SA to the new connection point.

Figure 2:
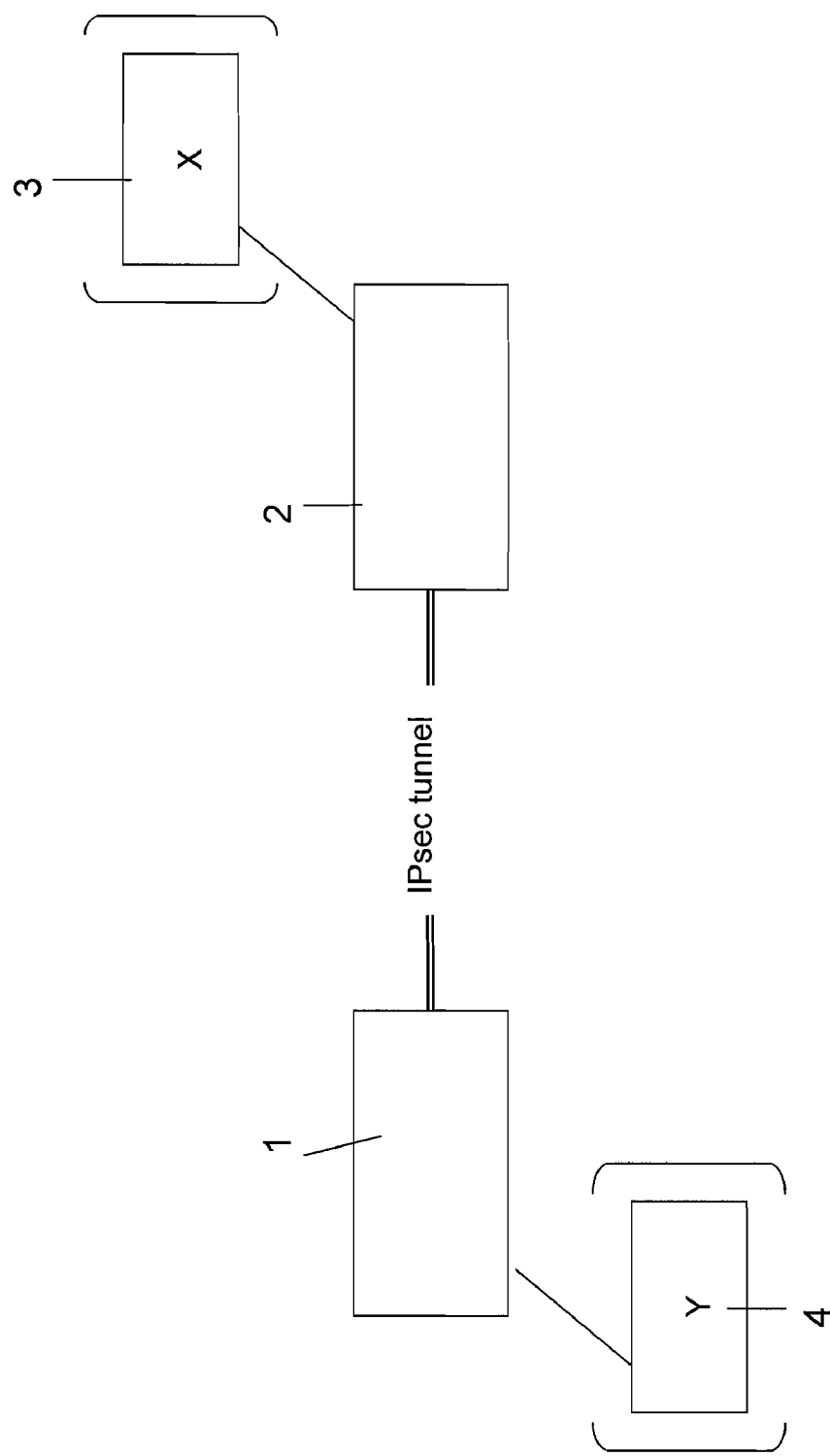
FIG. 2 illustrates a second example of a telecommunication network to be used in the invention.

The SA that existed between addresses A and X has now been changed to be between addresses B and X and is now complete. The next time the mobile terminal sends a message, host 2 in FIG. 1-3 is able to properly handle IPSec packets that come from address B and vice versa. Traffic can now flow inside the tunnel as normal with IPSec.

Any further movement from network to another can be accomplished with a similar exchange of signalling message (s). The IPSec SA does not need to be re-established until the lifetime of the SA has been exhausted.

The invention requires half a roundtrip if only a request message is used without a reply, and one roundtrip of the reply message is used.

The example describes the tunnel mode of IPSec, but transport mode can also be used. IPSec transport mode connections in examples can be replaced with IPSec tunnel mode connections and vice versa. IPSec transport mode combined with an external tunnelling protocol, such as the Layer 2 Tunnelling Protocol (L2TP), is a replacement for IPSec tunnel mode with regards to functionality.

The implementation may optimise the start of traffic flows with regard to message 10a (and optionally 11a); e.g. after sending 10a, the client may directly send IPSec-protected traffic. This essentially makes the handover latency zero, although it requires more complicated processing if the message 10a is lost while being delivered. However, the essential part of the invention is that it is possible to make the invention provide essentially zero-latency handover for client-to-server traffic, and half a roundtrip latency for server-to client traffic.

Different network topologies can, of course, be used in the invention. For instance in FIG. 1, the connection between hosts 2 and 3 may use IPSec transport or tunnel mode, instead of being plaintext, etc.

While the present invention has been described in accordance with preferred compositions and embodiments, it is to be understood that certain substitutions and alterations may be made thereto without departing from the spirit and scope of the following claims.

We claim:

1. A method for ensuring secure forwarding of a message in a telecommunication network, having at least one mobile terminal and another terminal and a security gateway therebetween, the method comprising:
   a) establishing a secure connection having a first address of the mobile terminal as a first end-point and a gateway address of the security gateway as a second end-point,
   b) the mobile terminal changing from the first address to a second address,
   c) while at the second address, the mobile terminal sending a request message to the gateway address of the security gateway to request the security gateway to change the secure connection to be defined between the second address and the gateway address of the security gateway,
   in response to the request message from the mobile terminal, the security gateway changing an address definition of the secure connection from the first address to the second address, and the mobile terminal sending a secure message in the secure connection from the second address of the mobile terminal to the other terminal via the security gateway.

2. The method of claim 1, wherein the secure connection is established in step a) by forming a Security Association (SA).

3. The method of claim 1, wherein in step c) a reply back to the mobile terminal is sent from the security gateway after the request from the mobile terminal to change the address.

4. The method of claim 1, wherein the request message and/or a reply message is encrypted and/or authenticated.

5. The method of claim 1 wherein the method further comprises the security gateway sending back a reply message to the mobile terminal at the second address to confirm the address change.

6. The method of claim 5, wherein the mobile terminal and the other terminal form an end-to-end connection whereby the secure connection is an IPSec transport connection or IPSec tunnel connection.

7. The method of claim 5, wherein a tunneling protocol is used for the secure connection between the mobile terminal and the security gateway.

8. The method of claim 5, wherein the other terminal is a mobile terminal.

9. A method for ensuring secure forwarding of a message in a telecommunication network, having at least one mobile terminal and another terminal and a security gateway therebetween, the method comprising:
   a) establishing a secure connection having a first address of the mobile terminal as a first end-point and a gateway address of the security gateway as a second end-point,
   b) the mobile terminal moving from the first address to a second address,
   c) while at the second address, the mobile terminal sending a request message to the gateway address of the security gateway to request the security gateway to change the secure connection to be defined between the second address and the gateway address of the security gateway,
   the security gateway changing an address definition of the secure connection from the first address to the second address,
   the other terminal sending a message to the second address of the mobile terminal via the security gateway, and
   the security gateway receiving the message from the other terminal and forwarding the message as an encrypted secure message to the second address.

* * * * *